United States Patent
Hsiao et al.

(10) Patent No.: US 10,697,816 B2
(45) Date of Patent: Jun. 30, 2020

(54) MEASURING DEVICE FOR MEASURING A VOLUME VARIATION OF LIQUID RECEIVED IN A BOTTLE

(71) Applicant: Wistron Corporation, New Taipei (TW)

(72) Inventors: Wen-Hsin Hsiao, New Taipei (TW); Hao-Chen Weng, New Taipei (TW); Shiuan-De Chen, New Taipei (TW); Chien Huang, New Taipei (TW); Chen-Wen Chien, New Taipei (TW); Wei-Kuo Lee, New Taipei (TW); Yen-Kai Chiu, New Taipei (TW)

(73) Assignee: Wistron Corporation, New Taipei (TW)

( * ) Notice: Subject to any disclaimer, the term of this patent is extended or adjusted under 35 U.S.C. 154(b) by 92 days.

(21) Appl. No.: 15/829,971

(22) Filed: Dec. 3, 2017

(65) Prior Publication Data

US 2018/0348036 A1  Dec. 6, 2018

Related U.S. Application Data (60) Provisional application No. 62/513,391, filed on May 31, 2017.

(30) Foreign Application Priority Data

Jul. 20, 2017 (TW) .............................. 106124411 A (51) Int. Cl.
*G01F 22/00* (2006.01)
*A47G 23/02* (2006.01)
(Continued)

(52) U.S. Cl.
CPC ......... *G01F 22/00* (2013.01); *A47G 23/0241* (2013.01); *A47G 23/16* (2013.01);
(Continued)

(58) Field of Classification Search
CPC ..... G01F 22/00; A47G 23/0241; A47G 23/16; G01G 19/414; G01G 19/4146; G01G 19/56
(Continued)

(56) References Cited

U.S. PATENT DOCUMENTS

| 6,772,891 B1 * | 8/2004 | Song ........................ A01K 9/00 119/71 |
| 2004/0007553 A1 * | 1/2004 | Smolko .............. A41D 13/0053 215/12.1 |

(Continued)

FOREIGN PATENT DOCUMENTS

| CN | 201101234 Y | 8/2008 |
| CN | 203557990 U | 4/2014 |

(Continued)

OTHER PUBLICATIONS

H2OPal Smart Water Bottle Hydration Tracker, https://www.amazon.com/H2OPal-Smart-Bottle-Hydration-Tracker/dp/B018YEAQCA?th=1, 2015.

*Primary Examiner* — Tarun Sinha
(74) *Attorney, Agent, or Firm* — Winston Hsu (57) ABSTRACT

A measuring device for measuring a volume variation of liquid received in a bottle includes a bottle sleeve and a weight detecting module. A first accommodating space, a second accommodating space and a first opening are formed on the bottle sleeve. The first opening is communicated with the first accommodating space. The bottle sleeve is elastic. An inner diameter of at least one portion of the first accommodating space is less than an outer diameter of the bottle. The bottle sleeve holds the bottle when the bottle is inserted into the first accommodating space via the first opening. The weight detecting module is disposed inside the second accommodating space to measure weights of the bottle and the liquid at different time points and to determine (Continued)

the volume variation of the liquid according to a difference of the weights of the bottle and the liquid at different time points.

10 Claims, 11 Drawing Sheets (51) Int. Cl.
*G01G 19/414* (2006.01)
*A47G 23/16* (2006.01)
*G01G 19/56* (2006.01)
*G01F 23/20* (2006.01)

(52) U.S. Cl.
CPC ....... *G01G 19/414* (2013.01); *G01G 19/4146* (2013.01); *G01G 19/56* (2013.01); *A47G 2200/226* (2013.01); *G01F 23/20* (2013.01)

(58) Field of Classification Search
USPC .......................................................... 73/149
See application file for complete search history.

(56) References Cited

U.S. PATENT DOCUMENTS

| 2016/0157583 | A1* | 6/2016 | Winter ................... A45D 34/00 |
| | | | 215/227 |
| 2017/0363341 | A1* | 12/2017 | Nguyen .................... F25D 3/08 |
| 2019/0125630 | A1* | 5/2019 | Van Kollenburg ....... A61J 9/06 |

FOREIGN PATENT DOCUMENTS

| CN | 104758184 A | | 7/2015 |
| CN | 104758187 A | | 7/2015 |
| CN | 204484809 U | * | 7/2015 |
| TW | M485674 U | | 9/2014 |
| WO | 2016/146016 A1 | | 9/2016 |

* cited by examiner

MEASURING DEVICE FOR MEASURING A VOLUME VARIATION OF LIQUID RECEIVED IN A BOTTLE

CROSS REFERENCE TO RELATED APPLICATIONS

This application claims the benefit of U.S. Provisional Patent Application No. 62/513,391 filed on May 31, 2017, which is hereby incorporated by reference in its entirety.

BACKGROUND OF THE INVENTION

1. Field of the Invention

The present invention relates to a measuring device, and more particularly, to a measuring device for measuring a volume variation of liquid received in a bottle.

2. Description of the Prior Art

With the rising healthcare awareness, people put more emphasis on water intake. Drinking enough water plays an important role in boosting metabolism for maintaining a healthy body. There are various products in the market, such as smart bottles and smart coasters, capable of reminding people of drinking water. However, taking a smart bottle as an example, a water sensor of the smart bottle should be installed in and pair with a specific bottle. Therefore, such product is extremely expensive and not compatible with a user's existing cup, even other common cups or bottles in the market, which is not practical. Furthermore, although a smart coaster can be adapted to most cups or bottles in the market, it is still inconvenient for a user to carry the smart coaster with the bottle at all times due to a separated design of the smart coaster and the bottle. Therefore, it fails to achieve a purpose of monitoring water intake and reminding of drinking water conveniently.

SUMMARY OF THE INVENTION

Therefore, the present invention provides a measuring device capable of supporting and weighting a bottle and being carried with the bottle for at least solving the aforementioned problems.

According to an embodiment of the present invention, the present invention discloses a measuring device for measuring a volume variation of liquid received in a bottle. The measuring device includes a bottle sleeve and a weight detecting module. A first accommodating space, a second accommodating space and a first opening are formed on the bottle sleeve. The first opening is communicated with the first accommodating space. The bottle sleeve is elastic. An inner diameter of at least one portion of the first accommodating space is less than an outer diameter of the bottle. The bottle sleeve holds the bottle when the bottle is inserted into the first accommodating space via the first opening. The weight detecting module is disposed inside the second accommodating space to measure weights of the bottle and the liquid at different time points and to determine the volume variation of the liquid according to a difference of the weights of the bottle and the liquid at different time points.

In summary, in the present invention, the inner diameter of the at least one portion of the first accommodating space is less than the outer diameter of the bottle, and the bottle sleeve can be made of elastic material. Therefore, when the bottle sleeve is sleeved on the bottle, the bottle sleeve tightly fits with the bottle to hold the bottle, so that the measuring device can be combined with the bottle firmly without falling off and prevent the bottle from turning over, which is convenient for a user to carry the measuring device with the bottle or to dispose the measuring device and the bottle uprightly. Furthermore, when it is desired to replace the bottle, the bottle sleeve can be elastically deformed according to the size of the bottle, so as to keep tightly fitting with the bottle. That is, the measuring device of the present invention can fit with different bottles having different sizes. In such a way, it is not necessary for a user to change his/her original drinking habit and also allows the user to replace the bottle according to the user's needs, which is convenient in use. Besides, a user's drinking water condition can be determined by the volume variation of the liquid received in the bottle measured by the measuring device of the present invention, which achieves a purpose of healthcare management.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
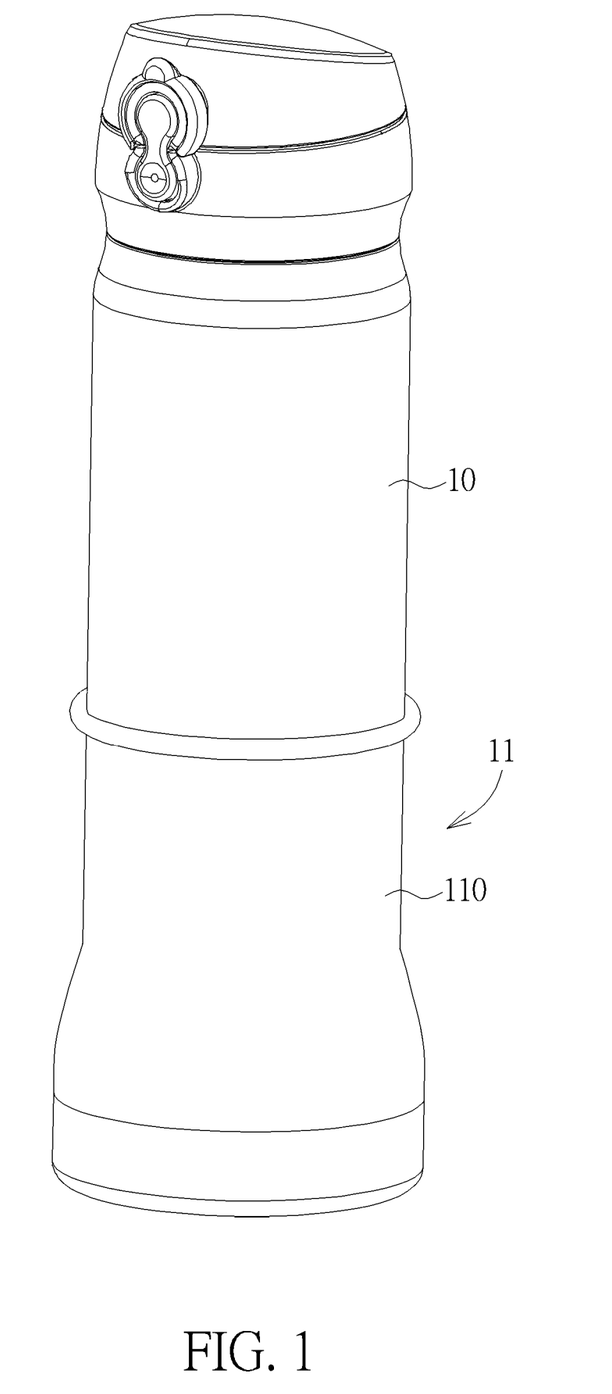
FIG. 1 is a schematic diagram of a measuring device assembled with a bottle according to a first embodiment of the present invention.
Figure 2:
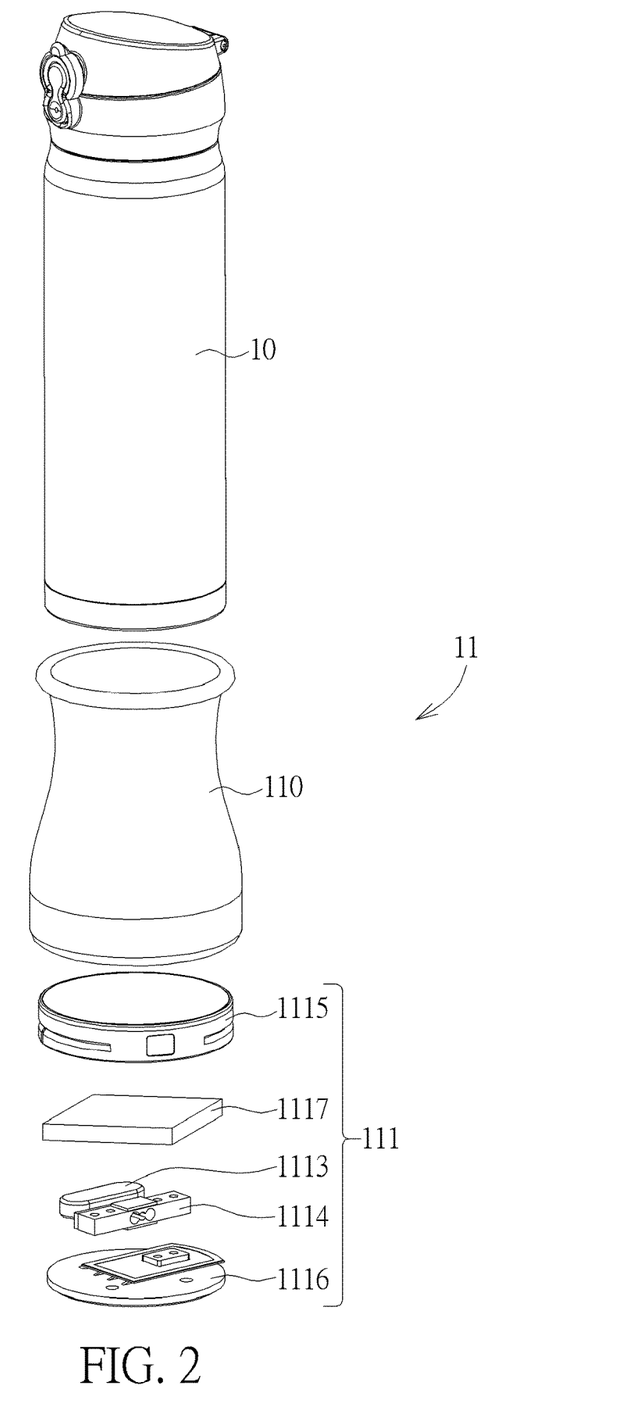
FIG. 2 is a partial exploded diagram of the measuring device detached from the bottle according to the first embodiment of the present invention.

Please refer to FIG. 1 and FIG. 2. FIG. 1 is a schematic diagram of a measuring device 11 assembled with a bottle 10 according to a first embodiment of the present invention. FIG. 2 is a partial exploded diagram of the measuring device 11 detached from the bottle 10 according to the first embodiment of the present invention. As shown in FIG. 1 and FIG. 2, the measuring device 11 of the present invention can be used with the bottle 10 and can be assembled with or detached from the bottle 10 according to different needs. The bottle 10 is for receiving liquid, such as drinking water or other drinks. The measuring device 11 includes a bottle sleeve 110 and a weight detecting module 111. The weight detecting module 111 is installed on the bottle sleeve 110 and for measuring weights of the bottle 10 and the liquid at different time points to determine a volume variation of the liquid according to a difference of the weights of the bottle 10 and the liquid at different time points so as to determine a user's drinking water intake when the bottle sleeve 110 is sleeved on a bottom portion of the bottle 10.

Figure 3:
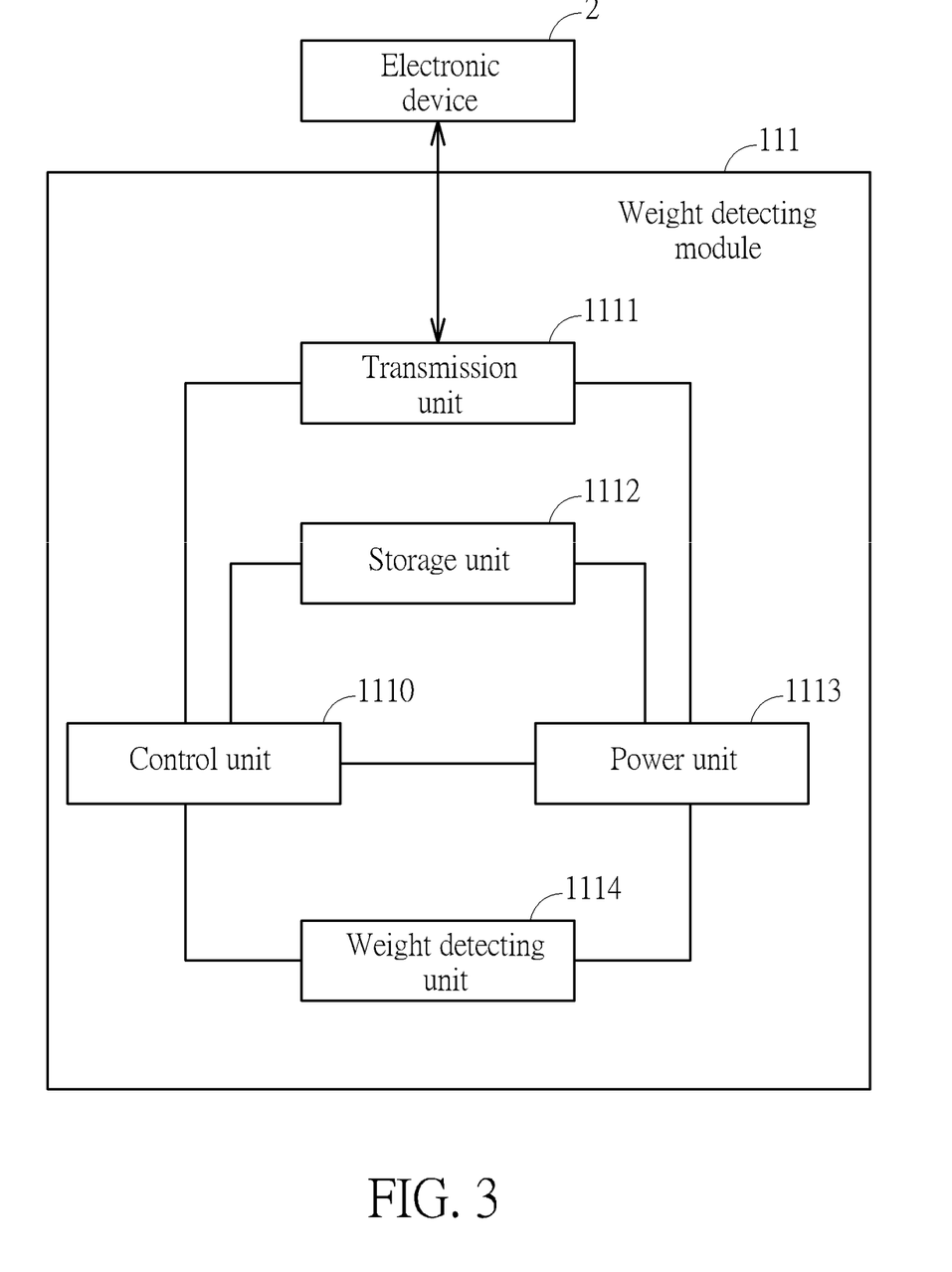
FIG. 3 is a functional block diagram of a weight detecting module according to the first embodiment of the present invention.

Please refer to FIG. 2 and FIG. 3. FIG. 3 is a functional block diagram of the weight detecting module 111 according to the first embodiment of the present invention. As shown in FIG. 2 and FIG. 3, the weight detecting module 111 includes a control unit 1110, a transmission unit 1111, a storage unit 1112, a power unit 1113 and a weight detecting unit 1114. The control unit 1110 is electrically connected to the transmission unit 1111, the storage unit 1112 and the weight detecting unit 1114 for controlling operation of the aforementioned components. The power unit 1113 is electrically connected to the transmission unit 1111, the storage unit 1112, the control unit 1110 and the weight detecting unit 1114 for providing the aforementioned components with electricity. The weight detecting unit 1114 measures the weights of the bottle 10 and the liquid at different time points. The control unit 1110 determines the volume variation of the liquid according to the difference of the weights of the bottle 10 and the liquid at different time points. The control unit 1110 can store the volume variation of the liquid in the storage unit 1112 or upload the volume variation of the liquid to an electronic device 2, such as a portable electronic device, a wearable electronic device, or a computer device, by the transmission unit 1111. For example, when the liquid is water, the electronic device 2 can record the volume variation of the water as water intake, which not only allows a user to review a history of the water intake during a specific period but also provides a reminding function for reminding the user of drinking water when the water intake is not enough.

In this embodiment, the control unit 1110 can be a microprocessor, a micro control unit (MCU), or a digital signal processor (DSP) and so on, and the power unit 1113 can be a substrate with chargeable lithium-ion batteries and so on. The transmission unit 1111 can be a Bluetooth transmitter, a universal serial bus connector, or any other wire or wireless transmission interface. The storage unit 1112 can be any type of memory. The weight detecting unit 1114 can be a load cell with a strain gauge. However, the present invention is not limited thereto.

As shown in FIG. 2, the weight detecting module 111 further includes a fixing component 1115, a moving component 1116 and a circuit board 1117. The fixing component 1115 and the moving component 1116 are movably combined with each other. The control unit 1110, the transmission unit 1111, the storage unit 1112, the power unit 1113 and the weight detecting unit 1114 are disposed on the circuit board 1117. The circuit board 1117 is installed on the fixing component 1115. The weight detecting unit 1114 is installed between the fixing component 1115 and the moving component 1116. When the moving component 1116 is forced to move relative to the fixing component 1115, the weight detecting unit 1114 is actuated by a force to calculate an applied pressure value accordingly. Detailed operational principle of the weight detecting module 111 is omitted herein for simplicity. Furthermore, it should be noticed that the fixing component 1115 and the moving component 1116 are one of examples to illustrate the weight detecting module 111 and can be exchanged in different installation positions as long as the two components can move relative to each other. That is, these two components also can be two moving components.

Figure 4:
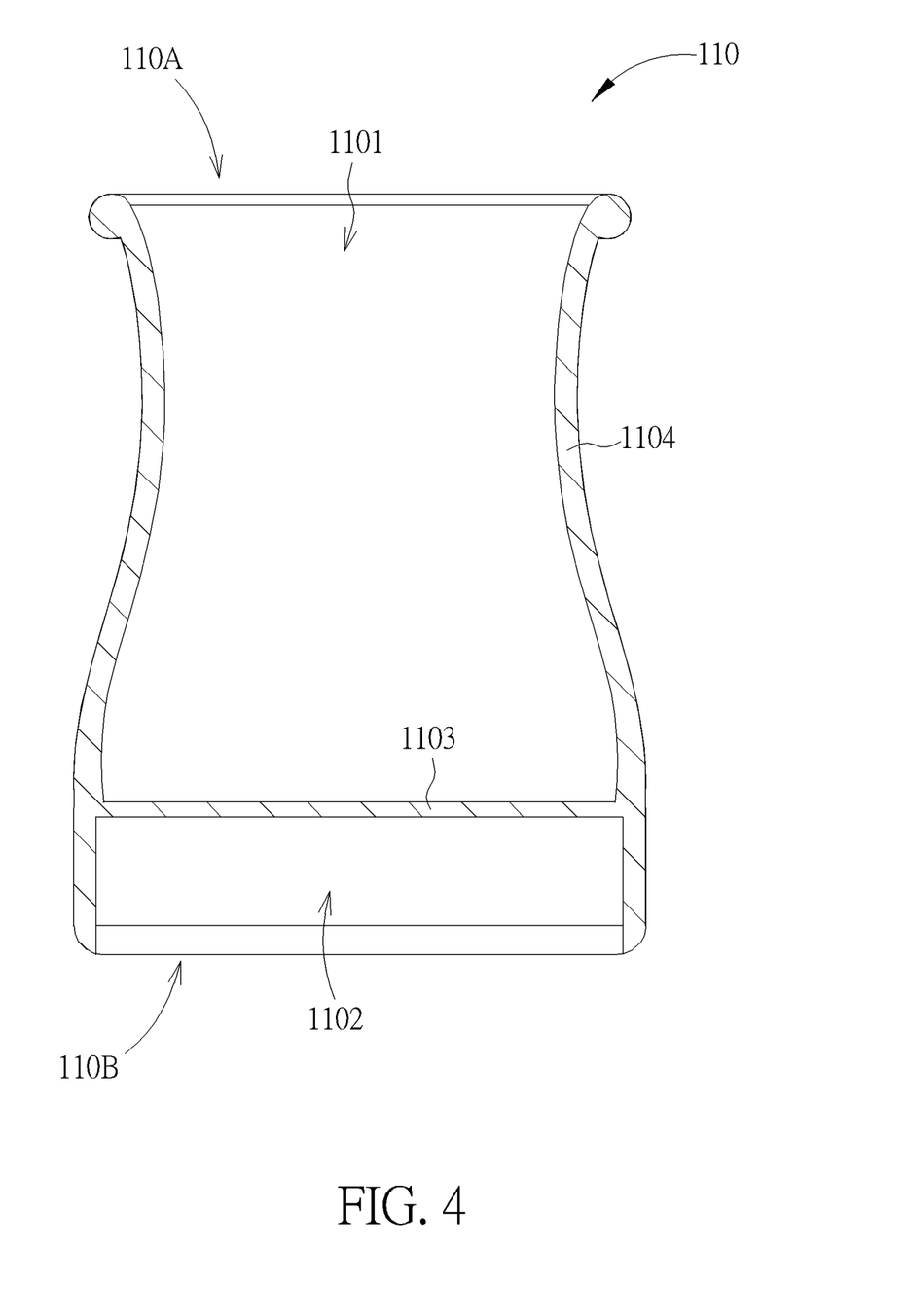
FIG. 4 is a sectional diagram of the bottle sleeve according to the first embodiment of the present invention.

Please refer to FIG. 1, FIG. 2 and FIG. 4. FIG. 4 is a sectional diagram of the bottle sleeve 110 according to the first embodiment of the present invention. As shown in FIG. 1, FIG. 2 and FIG. 4, in this embodiment, a first accommodating space 1101, a second accommodating space 1102, a partition portion 1103, a first opening 110A and a second opening 110B are formed on the bottle sleeve 110. The first opening 110A is communicated with the first accommodating space 1101. The second opening 110B is communicated with the second accommodating space 1102. The partition portion 1103 separates the first accommodating space 1101 and the second accommodating space 1102, i.e., the first accommodating space 1101 and the second accommodating space 1102 are two independent and separated chambers. The bottle 10 is inserted into the first accommodating space 1101 via the first opening 110A on a top of the bottle sleeve 110 to be held by the bottle sleeve 110. The weight detecting module 111 is installed inside the second accommodating space 1102 via the second opening 110B on a bottom of the bottle sleeve 110.

When the weight detecting module 111 is installed inside the second accommodating space 1102 and the bottle sleeve 110 holds the bottle 10, the bottle 10 and the measuring device 11 can be placed on a supporting surface, such as a desktop. The bottle sleeve 110 and the bottle 10, which may or may not contain liquid, partially received inside the first accommodating space 1101 press the weight detecting module 111 inside the second accommodating space 1102 cooperatively. The weight detecting module 111 can measure a net weight of the liquid and the bottle 10 by deducting a weight of the bottle sleeve 110 according to a correction value.

Furthermore, in this embodiment, the bottle sleeve 110 can be made of elastic material and includes a shrinking portion 1104 located at a position corresponding to the first accommodating space 1101. An inner diameter of the shrinking portion 1104 is less than an inner diameter of another portion of the bottle sleeve 110 except the shrinking portion 1104 and located at another position corresponding to the first accommodating space 1101, so that the bottle sleeve 110 can hold the bottle 10 when the bottle 10 is inserted into the first accommodating space 1101 of the bottle sleeve 110.

As shown in FIG. 1 and FIG. 4, when a user would like to monitor his/her water intake, the bottle 10 can be inserted into the bottle sleeve 110 via the first opening 110A of the bottle sleeve 110. At this moment, since the inner diameter of the shrinking portion 1104 is less than the outer diameter of the bottle 10, the shrinking portion 1104 can be elastically deformed outwardly to tightly fit with the bottle 10, so that the measuring device 11 can be combined with the bottle 10 firmly without falling off and prevent the bottle 10 from turning over. Therefore, it is convenient for a user to carry the measuring device 11 with the bottle 10 at all times rather than carrying the bottle 10 and the measuring device 11 separately. Afterwards, combination of the bottle 10 and the measuring device 11 can be placed on a supporting surface, such as a desktop, so that the weight detecting module 111 can measure a first weight of the bottle 10 and the liquid at a first time point. Alternatively, the measuring device 11 can be placed on a supporting surface first, and then the bottle 10 is inserted into the bottle sleeve 110. After drinking the liquid, the weight detecting module 111 can measure a second weight of the bottle 10 and the reduced liquid at a second time point. Accordingly, the weight detecting module 111 can determine a volume variation of the liquid according to a difference between the first weight at the first time point and the second weight at the second time point so as to determine the user's drinking water intake. For example, when a density of the drinking water is set as 1 gw/cm$^3$, the weight variation is approximately equal to the volume variation.

Figure 5:
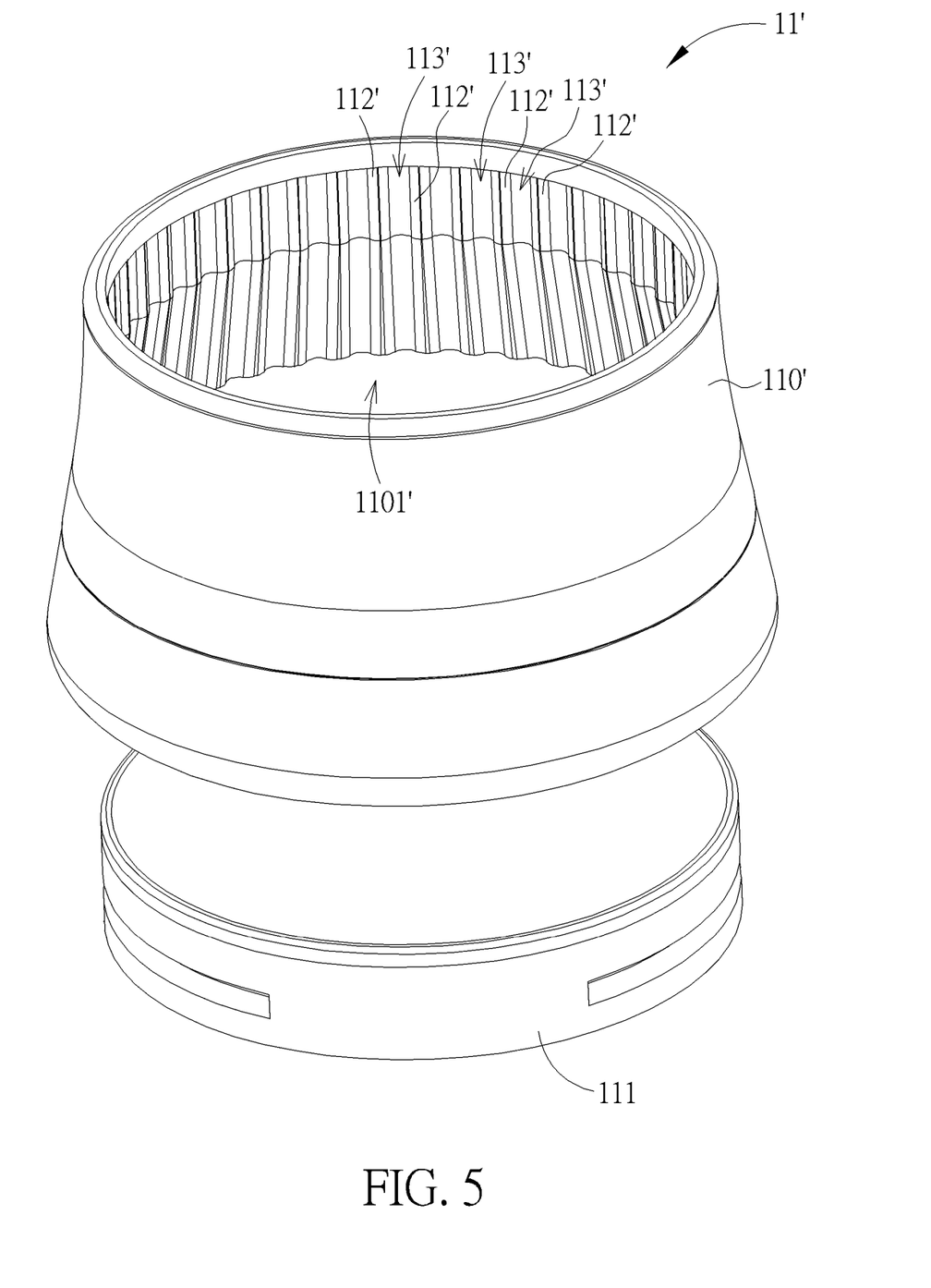
FIG. 5 and FIG. 6 are exploded diagrams of a measuring device at different views according to a second embodiment of the present invention.
Figure 6:
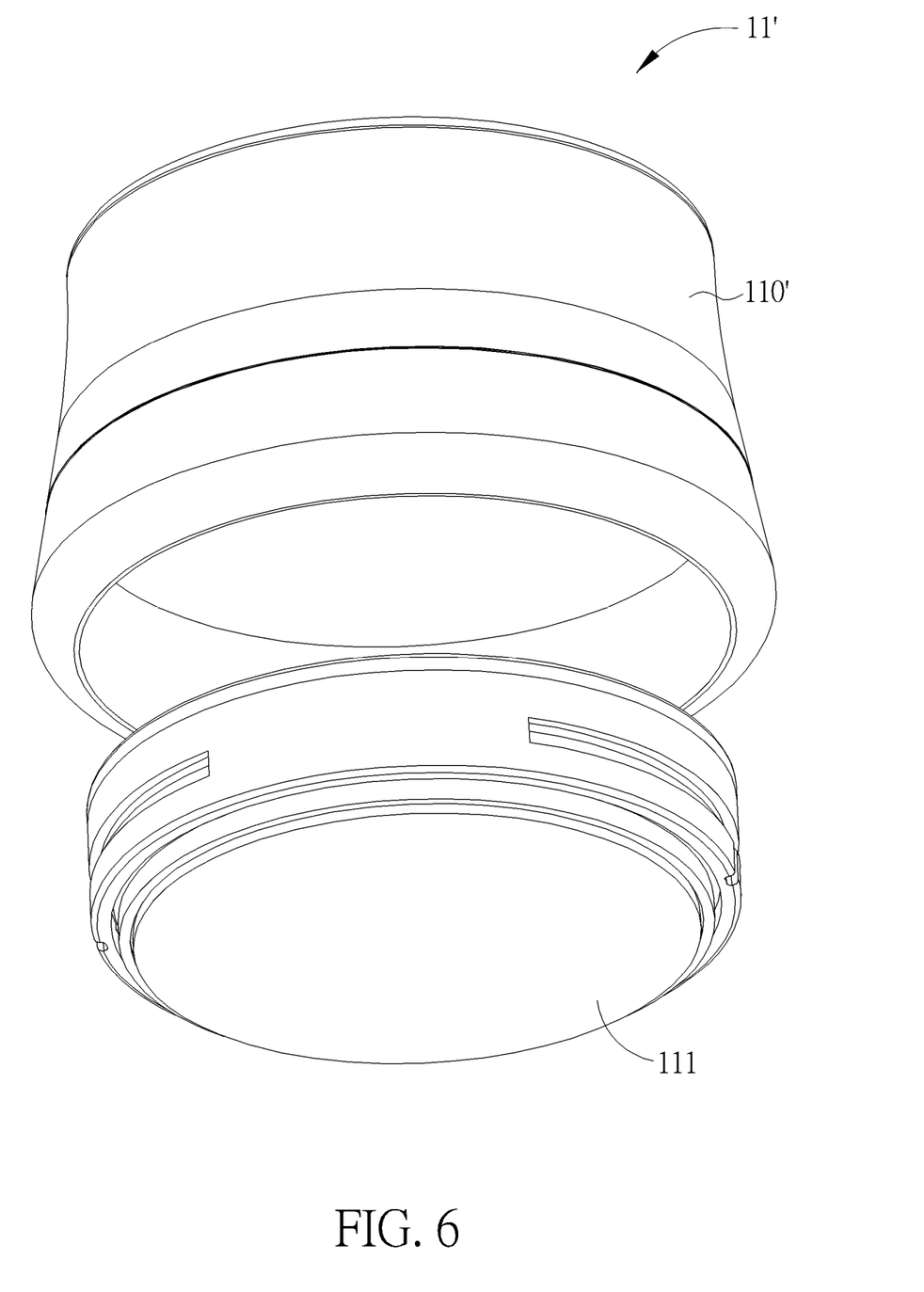

However, structure of the measuring device 11 is not limited to the aforementioned problems. Please refer to FIG. 5 and FIG. 6. FIG. 5 and FIG. 6 are exploded diagrams of a measuring device 11' at different views according to a second embodiment of the present invention. As shown in FIG. 5 and FIG. 6, different from the measuring device 11 of the aforementioned embodiment, a plurality of rib structures 112' of the measuring device 11' is disposed on an inner periphery of a bottle sleeve 110' and located an outer periphery of a first accommodating space 1101'. A discharging channel 113' is formed between the two adjacent rib structures 112'. In such a way, during a process that the bottle 10 is inserted into the first accommodating space 1101', air inside the first accommodating space 1101' can be discharged via the discharging channels 113' for reducing a resistance force against the bottle 10 entering into the first accommodating space 1101'.

Figure 7:
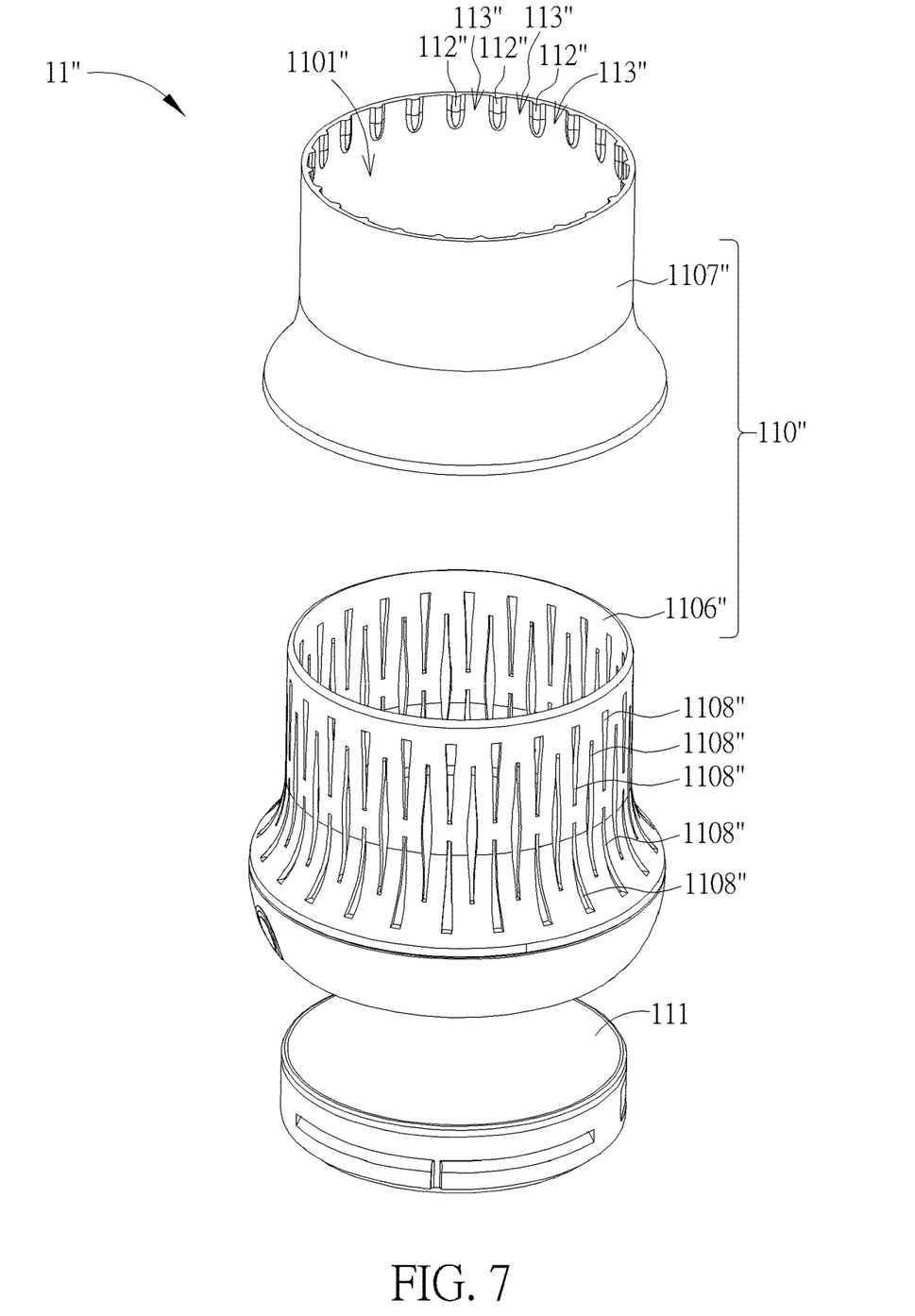
FIG. 7 and FIG. 8 are exploded diagrams of a measuring device at different views according to a third embodiment of the present invention.
Figure 8:
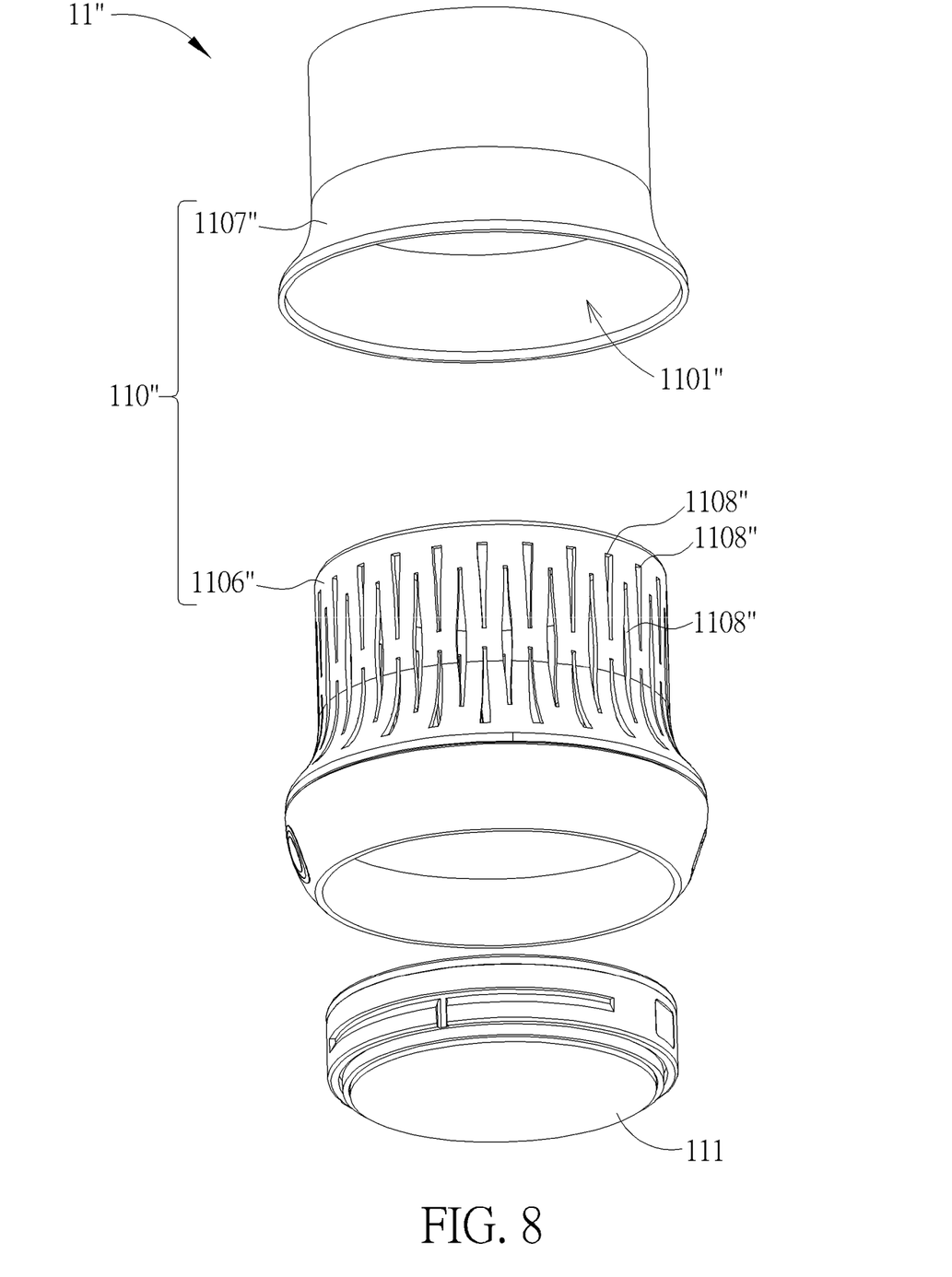

Please further refer to FIG. 7 and FIG. 8. FIG. 7 and FIG. 8 are exploded diagrams of a measuring device 11" at different views according to a third embodiment of the present invention. As shown in FIG. 7 and FIG. 8, different from the measuring device 11, 11' of the aforementioned embodiments, a bottle sleeve 110" of the measuring device 11' includes a first sleeve body 1106" and a second sleeve body 1107". The first sleeve body 1106" is sleeved on an outer periphery of the second sleeve body 1107". A first accommodating space 1101' for receiving the bottle 10 is formed inside the second sleeve body 1107". A plurality of apertures 1108" is formed on the first sleeve body 1106" and arranged in a staggered manner at intervals for reducing stiffness of the first sleeve body 1106" and increasing amount of elastic deformation of the first sleeve body 1106" to achieve a purpose of receiving the bottle 10 with a larger size. The plurality of rib structures 112" is disposed on an inner periphery of the second sleeve body 1107". A discharging channel 113" is formed between the two adjacent rib structures 112" for discharging air inside the first accommodating space 1101" during a process that the bottle 10 is inserted into the first accommodating space 1101", which reduces a resistance force against the bottle 10 entering into the first accommodating space 1101". Furthermore, in another embodiment, the bottle sleeve 110" also can include the first sleeve body 1106" only, and the second sleeve body 1107" can be omitted.

Figure 9:
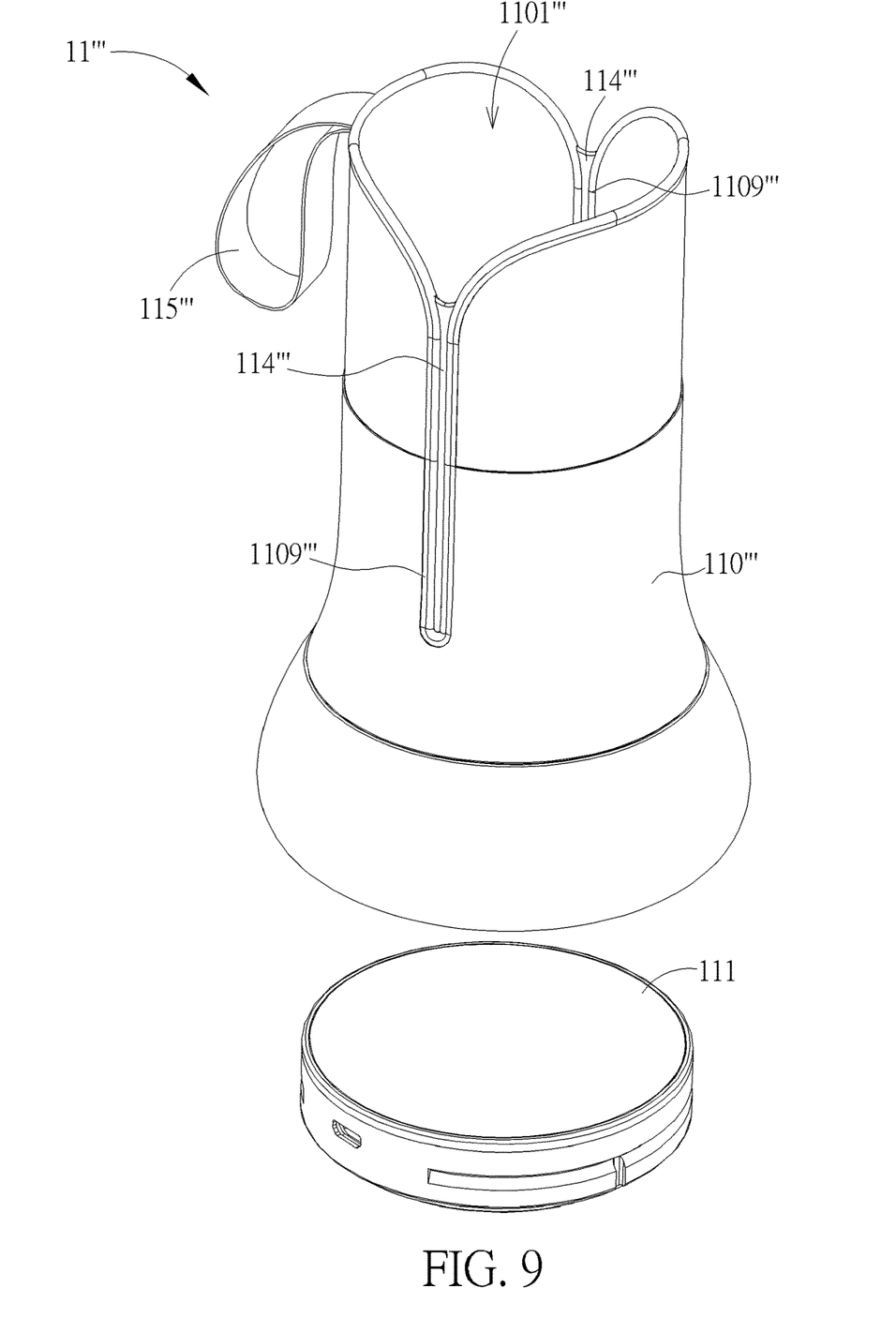
FIG. 9 and FIG. 10 are exploded diagrams of a measuring device at different views according to a fourth embodiment of the present invention.
Figure 10:
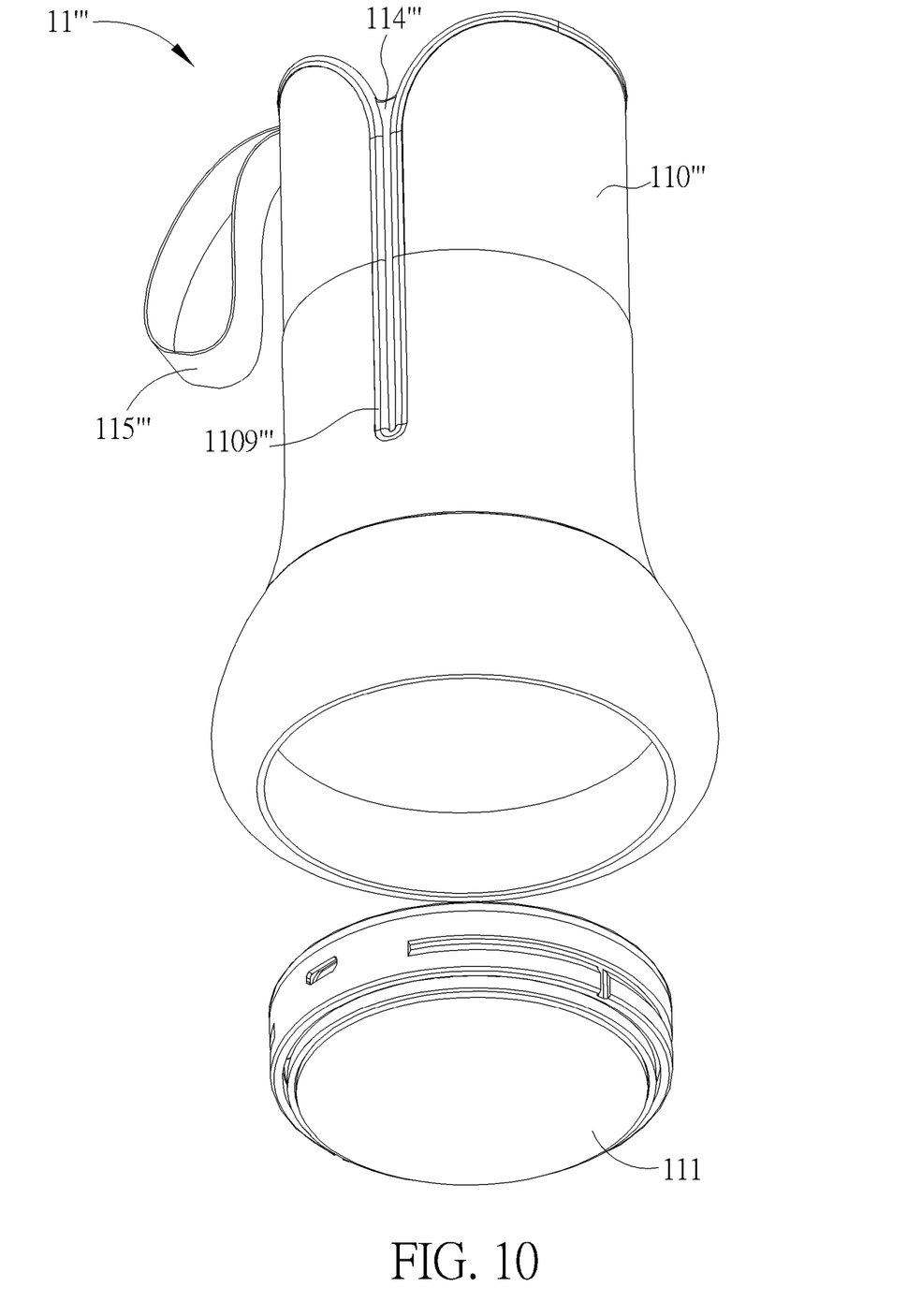

Please refer to FIG. 9 and FIG. 10. FIG. 9 and FIG. 10 are exploded diagrams of a measuring device 11''' at different views according to a fourth embodiment of the present invention. As shown in FIG. 9 and FIG. 10, different from the measuring device 11, 11', 11" of the aforementioned embodiments, a bottle sleeve 110''' of the measuring device 11''' further includes two connecting portions 114''' and a handle 115'''. The handle 115''' is connected to the bottle sleeve 110''' to provide a user with a convenient carry way. Two slot structures 1109''' are formed on the bottle sleeve 110''' symmetrically to divide the bottle sleeve 110''' into two half portions. The two connecting portions 114''' are disposed on the two slot structures 1109''' to connect the two half portions. In this embodiment, the connecting portion 114''' can be a zipper. When the zipper is open, it allows a user to remove or replace the bottle 10. When the zipper is zipped up, the close two half portions can hold the bottle 10 firmly in the first accommodating space 1101'''. Furthermore, the connecting portion 114''' also can be made of elastic material, such as elastic cloth or rubber. When the bottle 10 with a larger size is received inside the first accommodating space 1101''', the two half portion can be expanded outwardly due to elastic property of the elastic material, which increases amount of elastic deformation of the bottle sleeve 110''' for receiving the bottle 10 with the larger size. However, structures and configuration of the connecting portion 114''' and the slot structure 1109''' are not limited to this embodiment. For example, there can be only one slot structure 1109''' formed on the bottle sleeve 110''', and the measuring device 11''' can include only one connecting portion 114''' accordingly.

Figure 11:
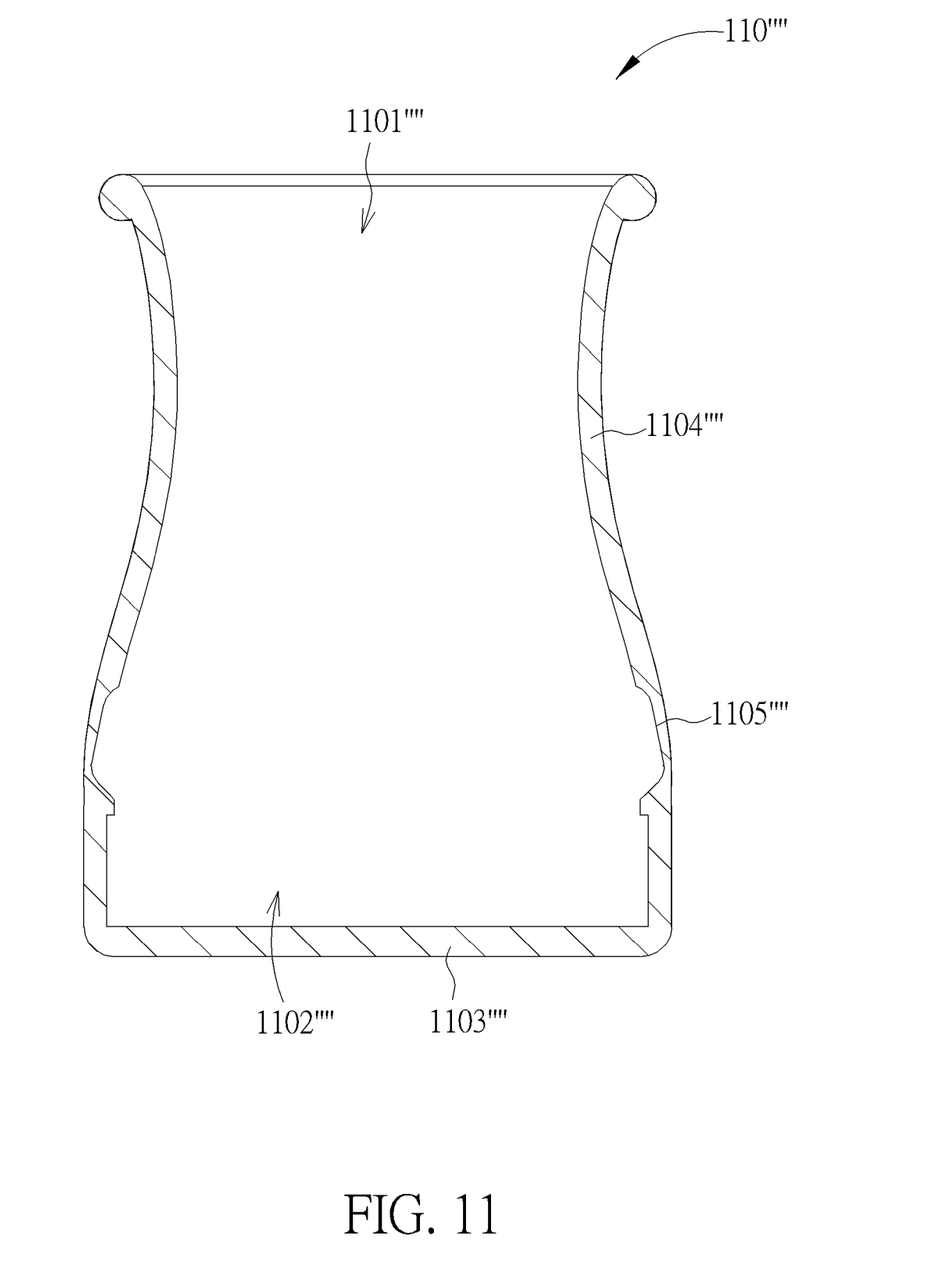
FIG. 11 is a sectional diagram of a measuring device according to a fifth embodiment of the present invention.

Furthermore, please refer to FIG. 11. FIG. 11 is a sectional diagram of a measuring device 11'''' according to a fifth embodiment of the present invention. As shown in FIG. 11, different from the measuring device 11, 11', 11", 11''' of the aforementioned embodiments, a first accommodating space 1101'''' and a second accommodating space 1102'''' of the measuring device 11'''' are communicated with each other, and a bottle sleeve 110'''' of the measuring device 11'''' includes a bottom layer 1103'''' for sealing a bottom side of the second accommodating space 1102'''', and the partition portion 1103 and the second opening 110B of the first embodiment can be omitted. The weight detecting module 111 is installed inside the second accommodating space 1102'''' from a top of the bottle sleeve 110''''. Furthermore, in this embodiment, when the bottle 10 is inserted into the first accommodating space 1101'''', the bottle 10 applies a force on the weight detecting module 111 directly. Since a shrinking portion 1104'''' of the bottle sleeve 110'''' holding the bottle 10 may at least partially supports the weight of the bottle 10 and the liquid, it effects on a detecting result of the weight detecting module 111. Therefore, in order to prevent interference of the detecting result of the weight detecting module 111, the bottle sleeve 110'''' can include a weakened portion 1105'''' located at a position corresponding the first accommodating space 1101'''' and near the second accommodating space 1102'''', and a thickness of the weakened portion 1105'''' is less than a thickness of another portion of the bottle sleeve 110'''' except the weakened portion 1105'''' and located at another position. It can prevent the shrinking portion 1104'''' from supporting the weight of the bottle 10 and the liquid, which ensures the weight detecting module 111 to measure the weight of the liquid and the bottle 10 more correctly.

In contrast to the prior art, in the present invention, the inner diameter of the at least one portion of the first accommodating space is less than the outer diameter of the bottle, and the bottle sleeve can be made of elastic material. Therefore, when the bottle sleeve is sleeved on the bottle, the bottle sleeve tightly fits with the bottle to hold the bottle, so that the measuring device can be combined with the bottle firmly without falling off and prevent the bottle from turning over, which is convenient for a user to carry the measuring device with the bottle or to dispose the measuring device and the bottle uprightly. Furthermore, when it is desired to replace the bottle, the bottle sleeve can be elastically deformed according to the size of the bottle, so as to keep tightly fitting with the bottle. That is, the measuring device of the present invention can fit with different bottles having different sizes. In such a way, it is not necessary for a user to change his/her original drinking habit and also allows the user to replace the bottle according to the user's needs, which is convenient in use. Besides, a user's drinking water condition can be determined by the volume variation of the liquid received in the bottle measured by the measuring device of the present invention, which achieves a purpose of healthcare management.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A measuring device for measuring a volume variation of liquid received in a bottle, the measuring device comprising:
   a bottle sleeve, whereon a first accommodating space, a second accommodating space, a first opening and a second opening being formed, the first opening being communicated with the first accommodating space, the second opening being communicated with the second accommodating space, the first opening and the second opening facing toward two opposite directions, the bottle sleeve comprises a partition portion integrated with the bottle sleeve to separate the first accommodating space and the second accommodating space, the bottle sleeve being elastic, the bottle sleeve comprising a shrinking portion located at a position in the first accommodating space, wherein an inner diameter of the shrinking portion is less than an inner diameter of another portion of the bottle sleeve in the first accommodating space, the inner diameter of the shrinking portion is less than an outer diameter of a portion of the bottle, and the bottle sleeve holds the bottle at least by a tight fit of the shrinking portion and the portion of the bottle when the bottle is inserted into the first accommodating space via the first opening; and
   a weight detecting module installed inside the second accommodating space via the second opening, the bottle and the bottle sleeve pressing the weight detecting module inside the second accommodating space cooperatively, and the weight detecting module is configured to measure weights of the bottle and the liquid at different time points and to determine the volume variation of the liquid according to a difference of the weights of the bottle and the liquid at different time points.

2. The measuring device of claim 1, further comprising a plurality of rib structures disposed on an inner periphery of the first opening on the bottle sleeve.

3. The measuring device of claim 1, wherein a plurality of apertures is formed on the bottle sleeve and arranged in a staggered manner at intervals.

4. The measuring device of claim 1, wherein the bottle sleeve comprises a first sleeve body and a second sleeve body, and the first sleeve body is sleeved on an outer periphery of the second sleeve body.

5. The measuring device of claim 4, further comprising a plurality of the rib structures disposed on an inner periphery of the second body opposite to the outer periphery of the second sleeve body, and a plurality of apertures being formed on the first sleeve body.

6. The measuring device of claim 1, wherein at least one slot structure is formed on the bottle sleeve, the bottle sleeve comprises at least one connecting portion disposed on the at least one slot structure, and the bottle sleeve is elastic due to the at least one connecting portion.

7. The measuring device of claim 6, wherein the at least one connecting portion is a zipper.

8. The measuring device of claim 6, wherein the at least one connecting portion is made of elastic material.

9. The measuring device of claim 1, wherein the weight detecting module comprises a control unit, a transmission unit, a storage unit, a power unit, and a weight detecting unit, the control unit is electrically connected to the transmission unit, the storage unit and the weight detecting unit to control operation of the transmission unit, the storage unit and the weight detecting unit, the power unit is electrically connected to the transmission unit, the storage unit, the control unit and the weight detecting unit to provide electricity for the transmission unit, the storage unit, the control unit and the weight detecting unit, the weight detecting module is configured to measure the weights of the bottle and the liquid at different time points, the control unit is configured to determine the volume variation of the liquid according to the difference of the weights of the bottle and the liquid at different time point, the control unit stores the volume variation into the storage unit, and the control unit uploads the volume variation to an electronic device by the transmission unit.

10. The measuring device of claim 9, wherein the weight detecting module comprises a fixing component, a moving component and a circuit board, the fixing component and the moving component are movably combined with each other, the control unit, the transmission unit, the storage unit, the power unit and the weight detecting unit are disposed on the circuit board, the circuit board is installed on the fixing component, and the weight detecting unit is installed between the fixing component and the moving component.

* * * * *